United States Patent [19]

Murphy et al.

[11] Patent Number: 5,276,957
[45] Date of Patent: Jan. 11, 1994

[54] METHOD AND SYSTEM FOR AUTOMATED ASSEMBLY OF PARTS SUCH AS PLASTIC PARTS

[75] Inventors: John F. Murphy, Almont, Mich.; Larry J. Winget, 1799 Foxknoll, Leonard, Mich. 48038; Jeffrey C. Davis, Clarkston; Robert D. Scott, Mt. Clemens, both of Mich.

[73] Assignee: Larry J. Winget, Leonard, Mich.

[21] Appl. No.: 570,824

[22] Filed: Aug. 22, 1990

[51] Int. Cl.⁵ .................................. B21D 39/03
[52] U.S. Cl. ...................... 29/430; 29/458; 29/404; 29/527.2; 118/64; 427/377
[58] Field of Search ........... 29/430, 458, 404, 527.2, 29/DIG.; 414/904; 156/350, 543, 546, 382; 118/61, 64, 65; 427/372.2, 377

[56] References Cited

U.S. PATENT DOCUMENTS

| | | | |
|---|---|---|---|
| 3,661,681 | 5/1972 | Edelberg et al. | 156/546 |
| 4,705,587 | 11/1987 | Smith | 29/DIG. 1 |
| 4,724,302 | 2/1988 | Penny et al. | 156/350 X |
| 4,789,417 | 12/1988 | Komatsu et al. | 29/430 X |
| 4,815,190 | 3/1989 | Haba et al. | 29/430 |
| 4,834,824 | 5/1989 | Tiedeck | 156/350 |
| 4,884,330 | 12/1989 | Sticht | 29/430 |
| 4,929,304 | 5/1990 | Urai et al. | 156/382 X |

*Primary Examiner*—Joseph M. Gorski
*Assistant Examiner*—S. Thomas Hughes
*Attorney, Agent, or Firm*—Brooks & Kushman

[57] ABSTRACT

Method and system are provided for the automated assembly of parts such as plastic parts into assemblies wherein assembly pallets loaded with their corresponding assemblies are stored and vertically indexed in an accumulator station to allow a previously applied material such as an adhesive to cure. Consequently, the system takes up little floor space. Entrance, dispensing and assembly stations, together with the accumulator station each has an enclosed chamber which is pressurized with an ambient at subatmospheric pressure in order to evacuate the enclosed chambers so that fumes from the adhesive utilized in securing the parts together are not allowed to escape at the stations during assembly of the parts.

18 Claims, 5 Drawing Sheets

5,276,957

METHOD AND SYSTEM FOR AUTOMATED ASSEMBLY OF PARTS SUCH AS PLASTIC PARTS

TECHNICAL FIELD

This invention relates to methods and systems for the automated assembly of parts and, in particular, to methods and systems for the automated assembly of parts wherein a material such as an adhesive is automatically dispensed on a first part and a second part is secured to the first part to form an assembly.

BACKGROUND ART

The assembly of parts such as plastic parts which are adhesively secured together typically require a substantial amount of floor space in order that the adhesive has a sufficient amount of time to cure. Because of these space requirements, it is difficult to properly exhaust this area in order to prevent fumes from the adhesive from presenting an environmental hazard to workers in the area.

The Komatsu et al U.S. Pat. No. 4,789,417 discloses a windowpane mounting system including an adhesive application device for applying adhesive to a windowpane conveyed along a conveyor.

The Haba Jr. et al U.S. Pat. No. 4,815,190 discloses a method and system for the automated assembly of parts on an assembly pallet in an assembly area. The method and system utilize a robot system including a program-controlled robot.

U.S. Pat. No. 3,629,010 discloses a method and apparatus for sealing a cover to an assembled battery. The cover of the battery is coated with a sealant material by dispensing the sealant through nozzles which pivot into communication with the cover and reuniting the cover to the container and thereafter curing the sealant. A pallet is used to transport the battery.

The Edelberg et al U.S. Pat. No. 3,661,681 discloses an apparatus for assembling insole strips. A hot melted adhesive is supplied to the edges of the central strip or the corresponding inside edges of outer strips at a first adhesive station. The strips are then delivered to an assembly station where two adjacent strips are moved laterally into alignment with the edges of the central strip. The finished composite sheet is then delivered to a stacking station.

U.S. Pat. Nos. 4,458,628; 4,592,495; 4,635,827; 4,639,878; 4,666,732; 4,699,575; 4,724,302; 4,753,824; 4,834,824; 4,858,172; and 4,822,647 all disclose various automatic adhesive-applying devices and robots for moving the adhesive applying device along a variable program path.

SUMMARY OF THE INVENTION

An object of the present invention is to provide a method and system for automated assembly of parts such as plastic parts adhesively secured together wherein assembly pallets loaded with their corresponding assemblies are vertically indexed in an accumulator station to allow the adhesive to cure.

Another object of the present invention is to provide a method and system for the automated assembly of parts such as plastic parts adhesively secured together wherein accumulator, entrance, dispensing and assembly stations, each of which has an enclosed chamber, is pressurized with an ambient at subatmospheric pressure in order to evacuate the enclosed chambers so that fumes from the adhesive are not allowed to escape at the stations.

In carrying out the above objects and other objects of the present invention, a method is provided for automated assembly of parts on an assembly pallet in an assembly area. The method utilizing an automatic dispenser movable relative to at least two control axes for dispensing material therefrom. The method includes the steps of transferring an assembly pallet adapted to receive and retain a first part thereon to an entrance station to place the first part on the assembly pallet at a predetermined position thereon and transferring the assembly pallet loaded with the first part from the entrance station to a dispensing station and into a work envelope of the dispenser. The method further includes the steps of automatically moving the dispenser through a predetermined dispensing path relative to the at least two control axes, automatically controlling the dispenser so that the flow of the material on the first part is controlled, and transferring the assembly pallet loaded with the first part from the dispensing station to an assembly station to assemble a second part on the first part with the material therebetween to form an assembly on the assembly pallet. Finally, the method includes the steps of transferring the assembly pallet loaded with the assembly from the assembly station to an accumulator station in a curing area for a predetermined period of time to allow the material to cure, and transferring the assembly pallet loaded with the assembly from the curing area to an unload station for unloading the assembly from the assembly pallet after the material is cured.

Further, in carrying out the above objects and other objects of the present invention, a system is provided for assembling a series of sets of parts movable along a guide path in an assembly area. The system includes an entrance station in the assembly area to load a first part of each set of parts and a dispensing station in the assembly area including a program-controlled manipulator having a work envelope and an automatic dispenser supported on the manipulator for movement relative to at least two control axes for dispensing material therefrom on a first part of each set of parts. The system further includes an assembly station in the assembly area to assemble a second part of each set of parts on its respective first part with the material therebetween to form an assembly, an accumulator station in a curing area to allow the material to cure, an unload station wherein each of the stations is located along the guide path, and transport means including first and second assembly pallets adapted to receive and retain first and second sets of the parts thereon, respectively, and for conveying the first and second assembly pallets along the guide path and for stopping and maintaining each of the assembly pallets in a stationary, predetermined position relative to the guide path during the loading, dispensing, assembly and unloading functions performed in the entrance, dispensing, assembly and unloading stations, respectively. Finally, the system includes control means for causing the manipulator to move the dispenser through a predetermined dispensing path relative to at least two control axes, for controlling the dispenser so that the flow of the material on the first part is controlled and for causing the transport means to move the first and second assembly pallets to each of the different stations along the guide path. After its assembly is unloaded, each assembly pallet is stopped and maintained in a stationary, predetermined position in the entrance station for further assembly of an additional set of parts.

Preferably, the first and second parts are clamped together on the assembly pallet, the unload station is coincident with the entrance station and the guide path is loop-shaped.

Also, preferably, the material is an adhesive, each of the entrance, dispensing, assembly, accumulator and unload stations has an enclosed chamber and wherein the system further comprises blower means for pressurizing the chambers with an ambient at subatmospheric pressure.

The accumulator station includes a first and second queuing rack structures for accumulating respective first and second pluralities of assembly pallets loaded with their corresponding assemblies in first and second predetermined spaced, non-contact stacks, respectively, in the curing area.

The advantages accruing to the method and system of the present invention are numerous. For example, the system uses a relatively small amount of factory floor space despite a high throughput and the curing time required for the adhesive. Also, fumes from the adhesive are effectively exhausted due to the compact nature of the system.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
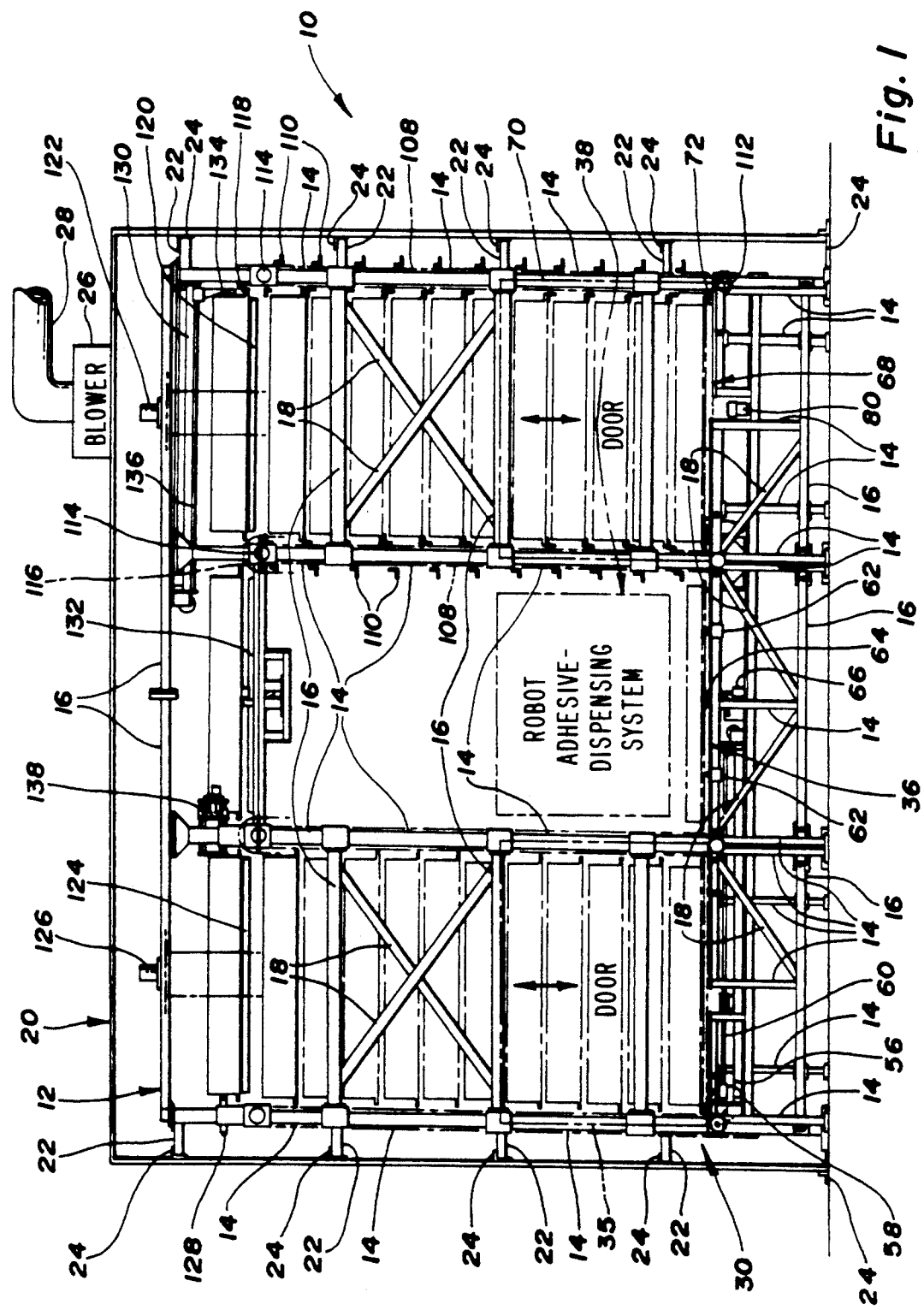
FIG. 1 is a front elevational view illustrating the method and system of the present invention.

Referring now to the drawing figures, there is illustrated in FIG. 1 a system, generally indicated at 10, for assembling a series of sets of parts movable along a guide path in an assembly area constructed in accordance with the present invention. The system 10 also performs the method of the present invention. In the embodiment of the invention described herein, the system is utilized to assemble the first and second plastic parts of a plastic assembly such as an automotive spoiler. Material such as an adhesive is utilized to secure the first and second parts together. After the adhesive has cured in the system, the parts are typically painted or decorated.

The system 10 is especially designed so as to take up a minimum amount of floor space (i.e. has a small footprint).

The system 10 includes a framework or framing generally indicated at 12 which includes a plurality of vertical beams 14, a plurality of horizontal beams 16 and plurality of diagonal beams 18 all interconnected together such as by welds and gaskets.

The framework 16 is completely enclosed within a plexiglass structure, generally indicated at 20, which preferably is made up of a plurality of interconnected plexiglass panels which are supported about the framework 12 by spacers 22 and brackets 24.

A blower 26 is located at the top of the plexiglass structure 20 and provides a partial vacuum within the plexiglass structure 20 at each of the stations therein in order to evacuate fumes from the adhesive used to hold the first and second parts together. A conduit 28 from the blower 26 may dispense the fumes outside of the building in which the system 10 is located or may dispense the fumes into a filter system. Air is drawn into the plexiglass structure 20 at the lower end of the plexiglass structure 20.

Figure 2:
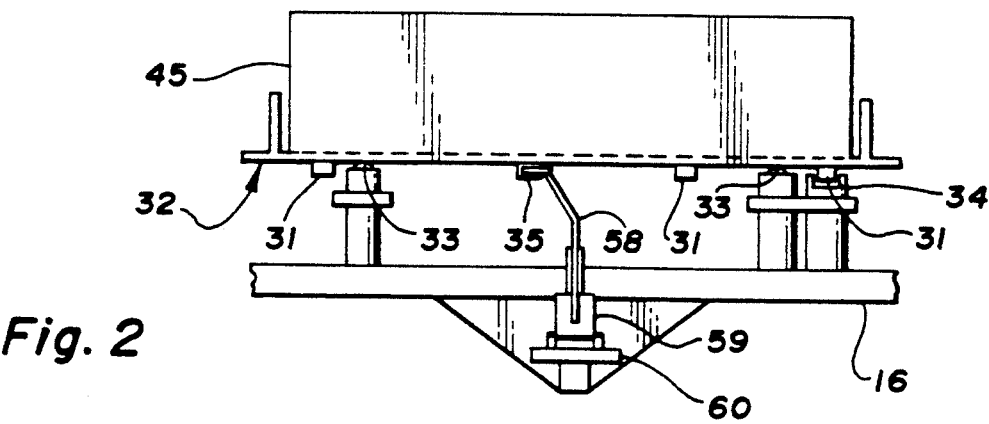
FIG. 2 is a side elevational view illustrating one of the various drive mechanisms for moving the assembly pallets horizontally.

Referring now to FIG. 1 in combination with FIG. 2, an entrance station generally indicated at 30 is provided in the assembly area to load a first plastic part on an assembly fixture or pallet 32. Preferably, the assembly pallet 32 is made of a lightweight material, such as aluminum. The pallet 32 has downwardly extending projections or followers 31 which ride in a guide track 34 (only one of which is shown in FIG. 2). The lower surface of the pallet 32 rides upon supported roller balls 33 between stations. The pallet 32 also includes a downwardly extending member 35 which is engaged by the brackets, such as bracket 58, mounted on various air cylinders to move the pallet 32 in a linear fashion.

A movable door, indicated by phantom lines at 35, also made of plexiglass may be raised to place a plastic part on the assembly pallet 32 at the entrance station. The plastic part may be placed on the assembly pallet 32 either manually or in an automatic fashion such as by a robot.

Figure 7:
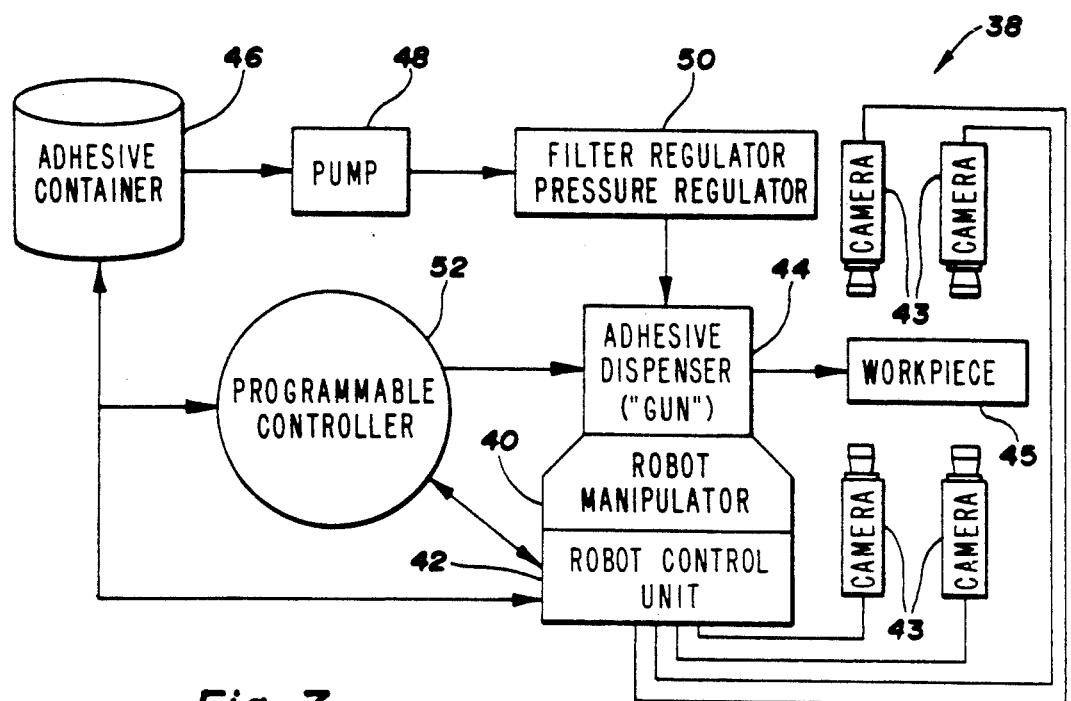
FIG. 7 is a schematic block diagram of a robotic adhesive-dispensing subsystem.

After the door 35 is closed, another door 74 separating the entrance station 30 from a dispensing station, generally indicated at 36, is opened and the assembly pallet 32 with the first plastic part positioned thereon is then moved along the guide track 34 into the dispensing station 36 in the assembly area. The door 74 is closed and a material such as an adhesive glue is dispensed on the first part by a robot adhesive-dispensing system, generally indicated at 38. The details of such a robot adhesive-dispensing system 38 are illustrated in FIG. 7.

The system 38 includes a robot manipulator 40 which operates under control of a robot control unit 42. The robot manipulator has a work envelope and an automatic glue gun or dispenser 44 supported on the manipulator for movement relative to at least two control axes for dispensing the glue therefrom on the first plastic part.

A plurality of video cameras 43 are spaced apart and are located in the dispensing station 36 to collect image data for use by the control unit 42 to determine the position and attitude of a workpiece 45 according to U.S. Pat. No. 4,639,878 which is hereby incorporated in its entirety by reference. In this way, the movement of the robot manipulator 40 is accurately controlled.

The dispenser 44 is typically attached to a wrist of the robot manipulator 40 together with an inlet hose for adhesive and one for a cleaning solvent. When a mixing unit is used such as for two component adhesives, the combined weight of the dispenser 44, the mixer and three hoses may necessitate the mounting of these on the arm of the robot manipulator 40. In this case, an additional tube is attached to the wrist of the robot 40 and leads the mixed material from the mixer to the workpiece 45 such as the first plastic part in the dispensing station 36.

The system 38 also includes an adhesive container 46, a pump 48 for pumping the adhesive from the adhesive container 46, and filtered pressure regulators 50.

Pump selection depends on the properties of the adhesive, size of the container 46 and the dispensing rate required. The system 38 must keep track of the level of the adhesive in the container 46 by means of a programmable controller 52 and stop the automatic operation of the adhesive dispenser 44 when the adhesive is depleted.

Because certain adhesives dry out, harden or solidify if not mixed or if left unused for a period of time, the system 38 typically has the capability of automatically purging spoiled material and cleaning the container 46 and the lines which run between the components of the system 38.

The programmable controller 52 is generally used to supervise the overall dispensing of the adhesive and enables communication between the robot manipulator 40, the container 46 and the dispenser 44. Typically, the programmable controller 52 is in communication with the robot control unit 42 to control the actuation of the dispenser 44 in coordination with the robot motion and for control of the level of the adhesive in the container 46.

The pallet 32 is pushed into the dispensing station 36 by an air cylinder 56 which drives a driver or bracket 58 upon extension of its push rod 59, generally as indicated in FIG. 2. The bracket 58 engages the member 35 on the lower surface of the pallet 32. The bracket 58 is guided in its movement by a guide rod 60.

Once the pallet 32 is in the dispensing station 36, shot pins actuated by air cylinders 62 together with a bracket 64 actuated by an air cylinder 66 lock the assembly pallet 32 in a known predetermined position prior to the dispensing of the adhesive by the system 38.

Figure 3:
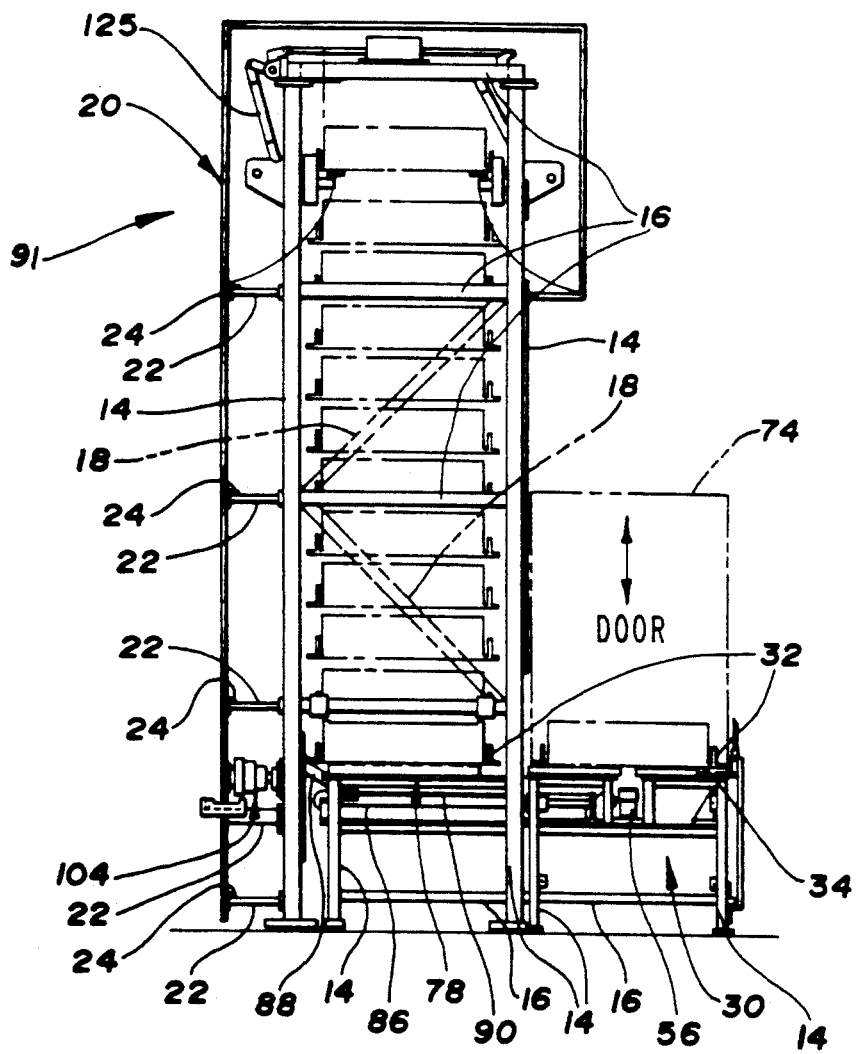
FIG. 3 is a side elevational view illustrating a lowerator of the system.

After the adhesive is dispensed, the shot pins and the bracket 64 are retracted by their respective air cylinders 62 and 66. As shown in FIG. 3, then a door, also indicated in phantom at 76, which separates the dispensing station 36 and an assembly station, generally indicated at 68, is opened. The assembly pallet 32 with the first part thereon is pushed to the assembly station 68 by another pallet 72 which is being pushed from the entrance station 70 to the dispensing station 36. In general, in the assembly station 68, a second plastic part is positioned on the first part after a second door, indicated in phantom at 70, has been opened. Again, the second part may be positioned on the first part either manually or automatically such as by another robot.

Once the assembly pallet 32 is located in the assembly station 68, the assembly pallet 32 engages a limit switch 72 which signals the air cylinder 56 to retract to its home position. At this time, doors 35 and 70 are permitted to open while doors 74 and 76 are closed. In general, doors 74 and 76 open to permit movement of a pallet between adjacent stations and are closed when adhesive is being dispensed in the dispensing station 36.

When the doors 35 and 70 are opened such as by operators, one operator loads another part onto another assembly pallet 32 at the entrance station 30. While this is occurring, the robot manipulator 40 dispenses an adhesive on a first part located on an assembly pallet located in the dispensing station 36. Simultaneously, a second operator at the assembly station 68 loads a top or second plastic part onto the first plastic part with the adhesive therebetween. Preferably, each assembly pallet 32 has a clamping and locking mechanism disposed thereon to clamp and lock the first and second plastic parts together at the assembly station 68. When these operations are complete at the stations 30 and 68, the first and second doors 35 and 70 are closed.

Figures 4, 5:
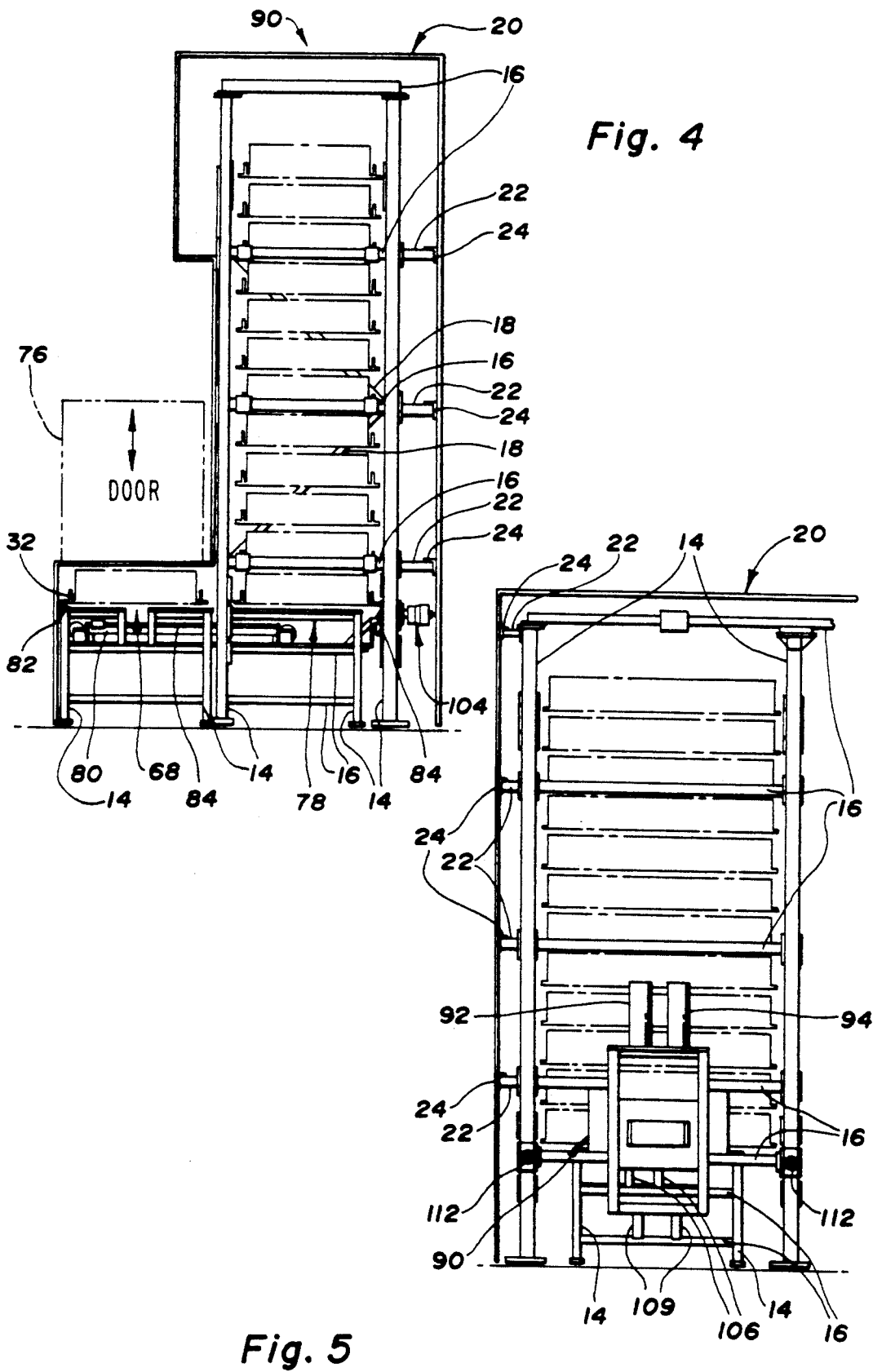
FIG. 4 is a side elevational view illustrating an elevator of the system.
FIG. 5 is a rear view partially broken away illustrating the elevator.
Figure 6:
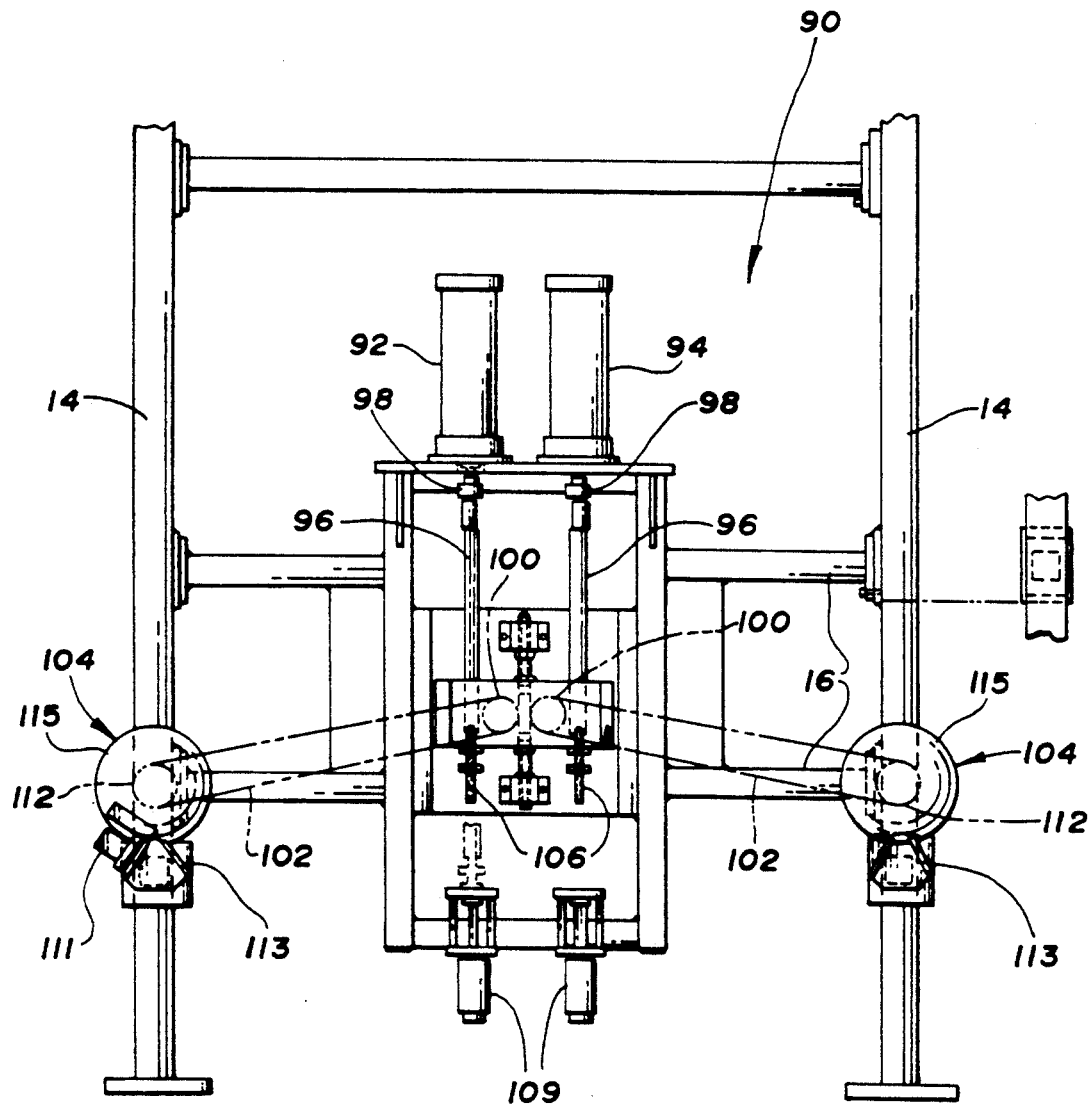
FIG. 6 is an enlarged elevational view of a drive mechanism of the elevator.

Referring now to FIG. 4, an assembly pallet 32 with the first and second parts clamped together in the assembly station 68 is moved into an accumulator station, generally indicated at 78, from the assembly station 68 by means of an air cylinder 80 which causes a bracket 82 attached thereto to pull the assembly pallet 32. The bracket 82 is guided along a guide rod 84 during movement of the bracket 82. The assembly pallet 32 stays in the accumulator station 78 within a curing area until the adhesive between the first and second parts on the pallets 32 has cured.

In the accumulator station 78, the assembly pallets 32 are indexed upwardly by an elevator, or queuing rack structure, generally indicated at 90, as best shown in FIGS. 5 and 4, then horizontally to the left as best shown in FIG. 1, and finally downwardly by a lowerator, generally indicated at 91, also in the form of a queuing rack structure, as best shown in FIG. 3. The lowerator 91 and the elevator 90 are substantially identical to one another and, consequently, the description of one is applicable to the other. The speed of the cycle is determined by the setting time of the glue adhesive.

Once in the accumulator station 78, the assembly pallet 32 engages a stop and limit switch 84. The limit switch 84 also signals the first air cylinder 56 to push the assembly pallets 32 currently in the entrance and dispensing stations 30 and 36, respectively, into their next successive station. For example, the assembly pallet 32 in the dispensing station 36 is pushed by the assembly pallet 32 in the entrance station 30 to the assembly station 68. Also, an assembly pallet 32 in the accumulator station 78 adjacent the entrance station 30 is pushed by an air cylinder 86 through a bracket 88 attached thereto from its lowermost position as indicated in FIG. 3 into the entrance station 30. The bracket is guided in its movements along a guide rod 90.

When the assembly pallet 32 containing the completed plastic assembly has moved from the accumulator station 78 to the entrance station 30 as indicated in FIG. 2, the adhesive is completely cured. The operator opens the door 35 and then removes the plastic assembly from the pallet 32 after unclamping the assembly from the assembly pallet 32. Consequently, the entrance station 30 also serves as an unload station. While the door 35 is still open, the operator places another first part on the assembly pallet 32.

After the pallet 32 with its completed assembly has been moved from the lowermost position of the lowerator 91 in the accumulator station 78 to the entrance station 30, the elevator 90 is actuated to raise the stack of assembly pallets.

The elevator mechanism 90 includes an indexing mechanism having first and second air cylinders 92 and 94 which operate their respective racks 96 through couplers 98. In turn, the racks 96 operate their respective pinion gears 100. The gears 100 are interconnected to their respective air clutches 104, each of which includes a gear through a chain 102. The elevator 90 includes two pairs of chains 108 having equally spaced paddles or brackets 110 formed thereon and which vertically extend from the clutch gear on a bottom drive shaft 112 to an idler gear 116 on an idler shaft 114, as best shown in FIG. 1. In this way, as the chains 108 move in a loop, the paddles 110 secured thereto move the assembly pallets 32 vertically upward.

When the air cylinders 92 and 94 extend, the elevator 90 indexes the stack of assembly pallets 32 an amount predetermined by adjustable stops 106, as best shown in FIG. 5. The stops 106 engage shock absorbers 109 to absorb the shock. The drive mechanism preferably includes a pair of brakes 111 for each drive shaft 112 (only one of which is shown) mounted by brackets 113 to vertical beams 14 to ensure that the chains 108 do not move between indexing steps. The brakes 111 are air actuated to selectively engage brake pads 115 which are mounted on the drive shafts 112 to rotate therewith.

Movement of the top assembly pallet 32 in the elevator 90 into an uppermost position as illustrated in FIG. 1 actuates a limit switch 118 which actuates the brakes 111, thereby holding the elevator 90 in place. At this time, the air clutches 104 release their air and the air cylinders 80 retract. At this time, the lowermost position in the elevator 90, as shown in FIG. 4, is empty.

Side lifter arms 120 are driven by an air cylinder 122 to lift the assembly pallet 32 from its respective paddles 110 of the elevator 90 through linkage which is described in greater detail hereinbelow. After lifting, the lifter arms 120 are locked into place by air cylinders (not shown). In like fashion, lowerator side lifter arms 124 are driven by an air cylinder 126, as best shown in FIG. 1, to pivot upwardly and lock into place against the assembly pallet 32 located at the uppermost position of the lowerator 91. This locking action energizes a limit switch 128 which signals an air cylinder 130 to push the loaded assembly pallet from the elevator side of the machine to a bridge 132 which communicates the elevator 90 and the lowerator 91 at the center of the framework 12. The air cylinder 130, like the other cylinders, causes a bracket 134 to move along a guide rod 136, thereby pushing the loaded assembly pallet 32 to the position on the bridge 132 illustrated in FIG. 1. An air cylinder stop 138 temporarily keeps the loaded assembly pallet 32 on the bridge 132 of the structure 12. After encountering the air cylinder stop 138, the air cylinder 130 generates a signal to cause the air cylinder 132 to return home. An assembly pallet on the bridge 132 is pushed into the uppermost position on the lowerator side by the pallet 32 moving from the elevator side to the bridge 132.

The lifter arms 120 and 124 are then taken out of their locked position upon retraction of their respective locking air cylinders. On the lowerator side, the air cylinder 126 through linkage 125, allows the lifter arms 124 to fold down to lower the assembly pallet 32 held thereby onto paddles on the chains of the lowerator 91. The air cylinder 122 through linkage (not shown but substantially identical to linkage 125) allows its lifter arms 120 to fold down to accept another pallet 32 at the top of the elevator 90. Once the assembly pallet engages the lowerator paddles, a limit switch (not shown) sends a signal to an air clutch of the lowerator drive mechanism to engage on the lowerator drive shaft which functions in a reverse manner as the elevator drive mechanism to lower the stack of assembly pallets 32.

This procedure continues until the assembly pallet 32 is in the position in the accumulator station 78 as illustrated in FIG. 3 adjacent the entrance station 30. The cycle then continues as previously described.

Figure 8:
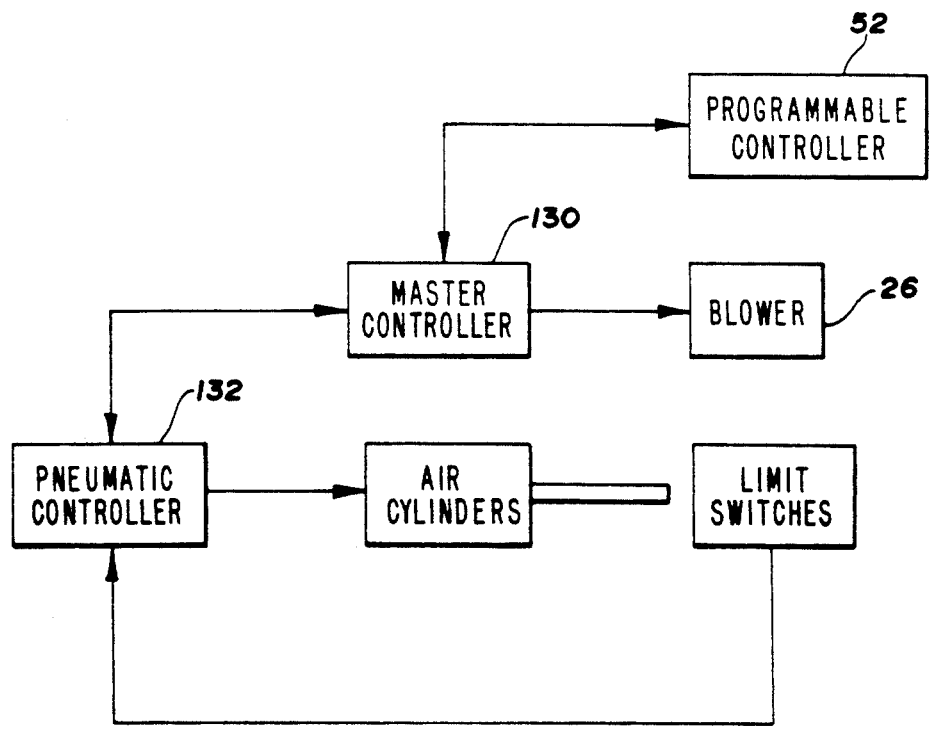
FIG. 8 is a schematic block diagram of an overall control system.

Referring now to FIG. 8, there is illustrated a control system for controlling the operation of the method and system of the present invention. A master controller 130 controls both the programmable controller 52 and the blower 26. A pneumatic controller 132 communicates with the master controller 130 to control actuation of the air cylinders as previously described. The limit switches as also previously described provide feedback signals to the pneumatic controller 132 provide actuating signals to the air cylinders as well as to the master controller 130 to control the blower 26 and the programmable controller 52 as previously described with reference to FIG. 7.

While the best mode for carrying out the invention has been described in detail, those familiar with the art to which this invention relates will recognize various alternative designs and embodiments for practicing the invention as defined by the following claims.

What is claimed is:

1. A method for automated assembly of parts on an assembly pallet in an assembly area, the method utilizing an automatic dispenser movable relative to at least two control axes for dispensing material therefrom, the method comprising the steps of:
    (a) transferring an assembly pallet adapted to receive and retain a first part thereon to an entrance station and placing the first part on the assembly pallet at a predetermined position thereon;
    (b) transferring the assembly pallet loaded with the first part from the entrance station to a dispensing station and into a work envelope of the dispenser;
    (c) automatically moving the dispenser through a predetermined dispensing path relative to the at least two control axes while dispensing the material on the first part;
    (d) automatically controlling the dispenser so that flow of the material on the first part is controlled;
    (e) transferring the assembly pallet loaded with the first part from the dispensing station to an assembly station and assembling a second part on the first part with the material therebetween thereby forming an assembly on the assembly pallet;
    (f) transferring the assembly pallet loaded with the assembly from the assembly station to an accumulator station in a curing area for a predetermined period of time to allow the material to cure; and
    (g) transferring the assembly pallet loaded with the assembly from the curing area to an unload station for unloading the assembly from the assembly pallet after the material is cured and further comprising the step of stacking a plurality of assembly pallets loaded with their corresponding assemblies in a first predetermined spaced, non-contact stack at the accumulator station in the curing area.

2. The method as claimed in claim 1 wherein the predetermined dispensing path is a continuous path and wherein steps (c) and (d) are performed substantially simultaneously so that a continuous bead of the material is dispensed.

3. The method as claimed in claim 1 further comprising the step of clamping the first and second parts together in the curing area.

4. The method as claimed in claim 1 wherein the unload station is coincident with the entrance station.

5. The method as claimed in claim 1 further comprising the step of automatically monitoring and coordinating operation of the dispenser with the transferring of the assembly pallet to and from the dispensing station to control the flow of parts and material in the assembly area.

6. The method as claimed in claim 1 wherein the assembly pallet is transferred along a loop-shaped guide path, each of the stations being located along the guide path.

7. The method as claimed in claim 1 wherein the assembly pallet is transferred along a guide path by a transfer mechanism and by means for selectively controlling movement of the transfer mechanism to permit the assembly pallet to stop at selected ones of the stations.

8. The method as claimed in claim 1 wherein the step of stacking includes the step of vertically indexing at least one assembly pallet loaded with its corresponding assembly in the accumulator station in preparation for receiving another assembly pallet loaded with its corresponding assembly.

9. The method as claimed in claim 1 or claim 8 further comprising the step of stacking a second plurality of assembly pallets loaded with their corresponding assemblies in a second predetermined spaced, non-contact stack at the accumulator station in the curing area.

10. The method as claimed in claim 9 wherein the step of stacking the second plurality of assembly pallets includes the step of vertically indexing at least one assembly pallet loaded with its corresponding assembly in the accumulator station in preparation for receiving another assembly pallet loaded with its corresponding assembly at the accumulator station.

11. The method as claimed in claim 9 further comprising the step of horizontally moving each assembly pallet between the first and second stacks at the accumulator station.

12. A method for automated assembly of parts on an assembly pallet in an assembly area, the method utilizing an automatic dispenser movable relative to at least two control axes for dispensing material therefrom, the method comprising the steps of:
(a) transferring an assembly pallet adapted to receive and retain a first part thereon to an entrance station and placing the first part on the assembly pallet at a predetermined position thereon;
(b) transfering the assembly pallet loaded with the first part from the entrance station to a dispensing station and into a work envelope of the dispenser;
(c) automatically moving the dispenser through a predetermined dispensing path relative to the at least two control axes while dispensing the material on the first part;
(d) automatically controlling the dispenser so that flow of the material on the first part is controlled;
(e) transferring the assembly pallet loaded with the first part from the dispensing station to an assembly station and assembling a second part on the first part with the material therebetween thereby forming an assembly on the assembly on the assembly pallet;
(f) transfering the assembly pallet loaded with the assembly from the assembly station to an accumulator station in a curing area for a predetermined period of time to allow the material to cure, wherein said material is an adhesive and each of the entrance, dispensing and assembling stations has an enclosed chamber;
(g) pressurizing each of said entrance, dispensing and assembly stations at subatmospheric pressure; and
(h) transfering the assembly pallet loaded with the assembly from the curing area to an unload station for unloading the assembly from the assembly pallet after the material is cured.

13. The method as claimed in claim 12 further comprising the step of communicating the entrance and dispensing chambers so that the subatmospheric pressure is maintained during step (b).

14. The method as claimed in claim 12 or claim 14 further comprising the step of communicating the dispensing and assembly chambers so that the subatmospheric pressure is maintained during step (e).

15. A method for automated assembly of parts on an assembly pallet in an assembly area, the method utilizing an automatic dispenser movable relative to at least two control axes for dispensing material therefrom, the method comprising the steps of:
(a) transferring an assembly pallet adapted to receive and retain a first part thereon to an entrance station and placing the first part on the assembly pallet at a predetermined position thereon;
(b) transfering the assembly pallet loaded with the first part from the entrance station to a dispensing station and into a work envelope of the dispenser;
(c) automatically moving the dispenser through a predetermined dispensing path relative to the at least two control axes while dispensing the material on the first part;
(d) automatically controlling the dispenser so that flow of the material on the first part is controlled;
(e) transferring the assembly pallet loaded with the first part from the dispensing station to an assembly station and assembling a second part on the first part with the material therebetween thereby forming an assembly on the assembly on the assembly pallet;
(f) transfering the assembly pallet loaded with the assembly from the assembly station to an accumulator station in a curing area for a predetermined period of time to allow the material to cure, wherein said material is an adhesive and each of the entrance, dispensing, assembling and accumulator stations has an enclosed chamber;
(g) pressurizing each of said entrance, dispensing, assembly and accumulator stations at subatmospheric pressure; and
(f) transfering the assembly pallet loaded with the assembly from the curing area to an unload station for unloading the assembly from the assembly pallet after the material is cured.

16. The method as claimed in claim 15 further comprising the step of communicating the assembly and accumulator chambers so that the subatmospheric pressure is maintained during step (f).

17. A method for automated assembly of parts on an assembly pallet in an assembly area, the method utilizing an automatic dispenser movable relative to at least two control axes for dispensing material therefrom, the method comprising the steps of:
(a) transferring an assembly pallet adapted to receive and retain a first part thereon to an entrance station and placing the first part on the assembly pallet at a predetermined positions thereon;
(b) transfering the assembly pallet loaded with the first part from the entrance station to a dispensing station and into a work envelope of the dispenser;

(c) automatically moving the dispenser through a predetermined dispensing path relative to the at least two control axes while dispensing the material on the first part;

(d) automatically controlling the dispenser so that flow of the material on the first part is controlled;

(e) transfering the assembly pallet loaded with the first part from the dispensing station to an assembly station and assembling a second part on the first part with the material therebetween thereby forming an assembly on the assembly on the assembly pallet;

(f) transfering the assembly pallet loaded with the assembly from the assembly station to an accumulator station in a curing area for a predetermined period of time to allow the material to cure, wherein said material is an adhesive and each of the entrance, dispensing, assembly, accumulator and unload stations has an enclosed chamber;

(g) pressurizing each of said entrance, dispensing, assembly, accumulator and unload stations at a subatmospheric pressure; and (h) transfering the assembly pallet loaded with the assembly from the curing area to an unload station for unloading the assembly from the assembly pallet after the material is cured.

18. The method as claimed in claim 17 further comprising the steps of:

communicating the entrance and dispensing chambers so that the subatmospheric pressure is maintained during step (b);

communicating the dispensing and assembly chambers sot hat the subatmospheric pressure is maintained during step (e);

communicating the assembly and accumulator chambers so that the subatmospheric pressure is maintained during step (f); and communicating the accumulator and unload chambers so that the subatmospheric pressure is maintained during step (g).

* * * * *